United States Patent
Brüninghaus et al.

(10) Patent No.: US 8,767,534 B2
(45) Date of Patent: Jul. 1, 2014

(54) METHOD FOR CONTROLLING THE TRANSMISSION OF DATA

(75) Inventors: Karsten Brüninghaus, Salzgitter (DE); Wolfgang Gröting, Oberhausen (DE)

(73) Assignee: Prasendt Investments, LLC, Wilmington, DE (US)

(*) Notice: Subject to any disclaimer, the term of this patent is extended or adjusted under 35 U.S.C. 154(b) by 818 days.

(21) Appl. No.: 10/551,731

(22) PCT Filed: Mar. 16, 2004

(86) PCT No.: PCT/EP2004/002709
§ 371 (c)(1),
(2), (4) Date: Oct. 3, 2005

(87) PCT Pub. No.: WO2004/088925
PCT Pub. Date: Oct. 14, 2004

(65) Prior Publication Data
US 2006/0274652 A1 Dec. 7, 2006

(51) Int. Cl.
*G01R 31/08* (2006.01)
*H04L 12/26* (2006.01)
*H04B 7/00* (2006.01)
*H04J 3/22* (2006.01)
*H04J 3/18* (2006.01)

(52) U.S. Cl.
USPC ............ 370/230; 370/310; 370/468; 370/477

(58) Field of Classification Search
None
See application file for complete search history.

(56) References Cited

U.S. PATENT DOCUMENTS

| | | | |
|---|---|---|---|
| 5,404,537 A * | 4/1995 | Olnowich et al. | 370/388 |
| 5,764,645 A * | 6/1998 | Bernet et al. | 370/395.52 |
| 6,690,678 B1 * | 2/2004 | Basso et al. | 370/468 |
| 6,754,189 B1 * | 6/2004 | Cloutier et al. | 370/329 |
| 6,792,284 B1 * | 9/2004 | Dalsgaard et al. | 455/525 |
| 6,950,947 B1 * | 9/2005 | Purtell et al. | 726/12 |
| 7,254,141 B1 * | 8/2007 | Desai et al. | 370/468 |
| 2002/0177413 A1 * | 11/2002 | Jouppi et al. | 455/67.1 |
| 2002/0181394 A1 * | 12/2002 | Partain et al. | 370/229 |
| 2002/0183055 A1 * | 12/2002 | Hunzinger et al. | 455/424 |

(Continued)

FOREIGN PATENT DOCUMENTS

| | | |
|---|---|---|
| DE | 102 47 164 | 5/2003 |
| WO | WO 97/33408 | 9/1997 |
| WO | WO 01/97458 | 12/2001 |
| WO | WO 03/019895 | 3/2003 |

OTHER PUBLICATIONS

Woo et al., "A Transmission Control Scheme for Media Access in Sensor Networks," International Conference on Mobile Computing and Networking Proceedings of the 7th Annual International Conference on Mobile Computing and Networking., 2001, 17 sheets.

*Primary Examiner* — Kwang Yao
*Assistant Examiner* — Jutai Kao

(57) ABSTRACT

A method for controlling the transmission of data via data connections associated with different applications, by means of a transmission medium in a local network having at least two stations for data transmission. Different priorities and different parameters characterizing a quality of service are associated with the applications. The establishment, by a first station, of a new data connection associated with a first application is limited according to the available free channel capacity of the transmission medium and the use of the transmission medium by existing data connections having associated applications containing a priority corresponding to the first application.

13 Claims, 3 Drawing Sheets

(56) References Cited

U.S. PATENT DOCUMENTS

| | | | |
|---|---|---|---|
| 2003/0058871 A1* | 3/2003 | Sastry et al. | 370/401 |
| 2003/0182430 A1* | 9/2003 | Aalto | 709/227 |
| 2004/0071133 A1* | 4/2004 | Yusko et al. | 370/356 |
| 2004/0203820 A1* | 10/2004 | Billhartz | 455/452.1 |
| 2005/0117511 A1* | 6/2005 | Tsujimoto | 370/229 |
| 2006/0071853 A1* | 4/2006 | Sayers | 342/432 |
| 2008/0056226 A1* | 3/2008 | Zhao et al. | 370/342 |

* cited by examiner

METHOD FOR CONTROLLING THE TRANSMISSION OF DATA

FIELD OF THE TECHNOLOGY

The present disclosure relates to a method for controlling the transmission of data.

BACKGROUND

From the steadily converging communications and information technologies, networks are known, such as for example the "local area network" LAN, with a multitude of stations designed for data transmission, in which the transmission of data is effected by conduction, i.e. over wires which connect the stations, while for a local network constructed in accordance with the IEEE 820.11 standard (wireless local area network, WLAN) the transmission is realized by wireless means, i.e. over a radio link, with a hybrid network of stations which are linked in via wires or radio links also being permissible in the case of a WLAN.

Stations that are connected to decentralized and non-deterministic networks of this type mostly have applications implemented on them, or in some cases permanently installed in them, which cover various services and which—depending on the nature of the station—can differ from one station to another. Thus, the convergence of networks in the information and communication technologies has led to the development of networks and services from the transmission of "non-time-critical" data, such as arises with a file transfer or the transmission of e-mails, through to networks with "time-critical" data, such as for example the transmission of streaming media, speech data ("Voice over IP, VOIP) and video conferences. One reason for these latter services are time-critical is that delays and/or loss of data is immediately detected, i.e. heard or seen, by a user, and for this reason, the associated data should be transmitted as nearly as possible in real-time.

Accordingly, a so-called quality of service has been introduced in the IEEE802.11 standard. The term quality of service (QoS) is to be understood as covering all methods which influence the data flows in LANs and WANs in such a way that the service is prioritized or arrives at the receiver with a specified quality. A prioritization approach provides for a higher priority being assigned to time-critical services, such as video-conferencing, than to non-time-critical ones, whereby data packets with a higher priority are preferentially transmitted.

A disadvantage in networks of this type is that each of the stations, at which data is ready to be transmitted, has the same right to occupy the transmission medium if the data to be sent has the same priority. As the number of transmitting stations increases, the capacity of the medium available for each station decreases steadily until it is no longer possible to adhere to quality of service parameters such as the data transmission rate and delay. The ultimate result of this, especially in connection with the provision of time-critical services such as voice or video stream transmission, is that none of these services can be handled to the satisfaction of the service user.

BRIEF SUMMARY

Data links are assigned to different applications over a transmission medium in a network, particularly a local one, having at least two stations designed for data. Applications are assigned different priorities together with different parameters to identify a quality of service, where the establishment of a new data link by a first station, assigned to a first application, is restricted as a function of the available free channel capacity on the transmission medium together with the occupancy of the transmission medium by existing data links, for which the applications have a priority corresponding to that of the first application.

The method ensures that existing links, in particular those for applications with high quality of service requirements, such as for example video or voice data transmission, are not detrimentally affected by newly-arising connection wishes from applications with the same priority class. In this way it is possible to ensure that the quality of the services which have already been offered remains largely constant.

When there is a requirement for the establishment of a new data link, this data link is set up by the first station without regard for the current utilization, while the transmission medium is occupied by data links assigned to an application with at least a second priority corresponding to that of the first application, at least one of the second stations which are maintaining these links signals in such a way that on the transmission medium a message is communicated with the highest priority to the first station and, after it has received the message, the first station suspends the new data link, at least temporarily, then the determination of the current resource usage is simplified, because this is already indicated by those stations which are already active. This further permits externally initiated occupancy control.

Also, when there is a request for the establishment of a new data link, the first station determines whether a measure of the available free channel capacity corresponds to a measure of the necessary channel capacity given by the parameters of the first application. Any data traffic that is assigned to applications with lower priority than the priority of the first application is regarded, in the context of the determination procedure, as free channel capacity. If the result of the determination is positive, the data link is set up. If the result of the determination is negative, the establishment of the data link is suspended, at least temporarily.

In doing this, the assessment of the free channel capacity should preferably be based on a threshold decision, where the channel capacity is regarded as free up to the point where a threshold is reached. Here, the threshold corresponds in general to a previously defined percentage level of data traffic which is assigned to applications with lower priority. In this connection, a threshold of this type offers the advantage that, if structured as a parameter, it can easily be modified appropriately for the conditions in the system.

Further disclosed is a method for controlling the transmission of data, via data links which are assigned to different applications, over a transmission medium in a network, in particular a local one, with at least two stations designed for data transmission, where the applications are assigned different priorities together with different parameters to identify a quality of service, characterized in that the establishment by a first station of a new data link, assigned to a first application, is restricted as a function of the available free channel capacity on the transmission medium together with the occupancy of the transmission medium by existing data links, for which the applications have a priority corresponding to that of the first application.

In one embodiment, a) for an existing request for the establishment of a new data link, the first station determines whether a measure of the available free channel capacity corresponds to a measure of the necessary channel capacity given by the parameters of the first application, with at least part of any data traffic which is assigned to applications with lower priority than the priority of the first application being considered, in the context of the determination procedure, to be free channel capacity, and if the result of the determination is positive, the data link is established, and b) if the result of the determination is negative the establishment of the data link is suspended, at least temporarily. The channel capacity may be regarded as free up to the point where a threshold is reached, with this threshold corresponding to a relative fraction of the data traffic which is assigned to applications with a lower priority.

In an alternative embodiment, a) when there is an existing request for the establishment of a new data link by the first station, the data link is established without regard for the current utilization, b) if the transmission medium is occupied by data links assigned to an application with at least a second priority corresponding to that of the first application, at least one of the second stations which are maintaining these links signals in such a way that on the transmission medium a message is communicated with the highest priority to the first station, c) after it has received the message, the first station suspends the new data link, at least temporarily.

In either of the above two embodiments, if the result of establishing the link is negative, a delay time is set after the expiry of which the steps are repeated. After each repetition, the delay time may be increased by a discrete value. The repetitions may then continue until either the establishment of a data link is permitted or the attempt to establish it is finally halted by a termination condition. The duration of the suspension before the steps are repeated can be prescribed as part of the message by the second station as a function of an assessment of the second data link.

BRIEF DESCRIPTION OF THE DRAWINGS

The various objects, advantages and novel features of the present disclosure will be more readily apprehended from the following Detailed Description when read in conjunction with the enclosed drawings, in which.

DETAILED DESCRIPTION

Figure 1:
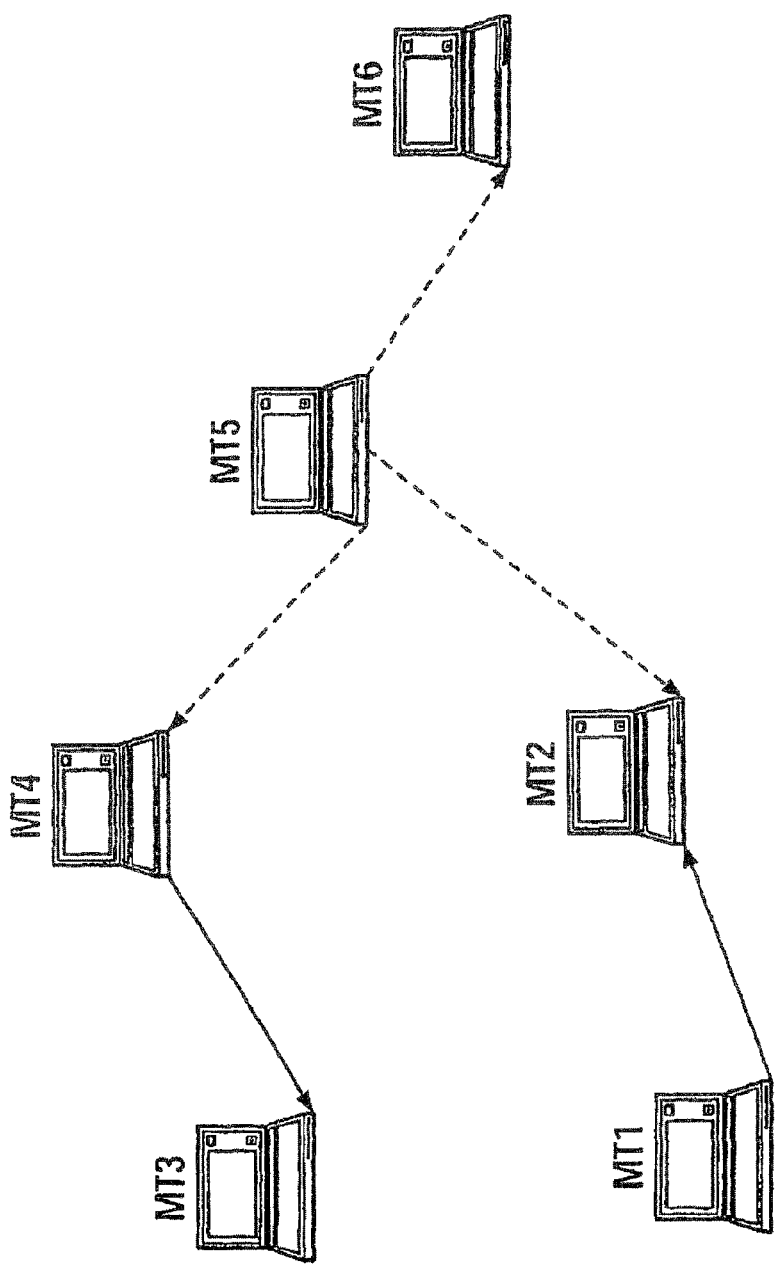
FIG. 1 illustrates an arrangement of a wireless local network according to an exemplary embodiment.

FIG. 1 shows as a model six stations MT1 . . . MT6 in a wireless network which makes use of the method in accordance with the present disclosure.

In the embodiment of FIG. 1, it is assumed that, between a first station MT1 and a second station MT2, and between a third station MT3 and a fourth station MT4, data is transmitted wirelessly (continuous lines), i.e. over a defined air interface. Also, the data stream is assumed as not fully using up the channel capacity of the air interface, so that the quality of service, required for the services provided by the data transmission, for example video and voice data transmission, can be adhered to without loss.

Starting from this initial situation, three possible more advanced scenarios will be discussed for purposes of illustration.

Scenario 1: A fifth station MT5 wants to transmit data to a sixth station MT6, until now inactive.

Scenario 2: The fifth station MT5 wants to transmit data to a station which is already receiving high-priority data, e.g. video-conferencing, such as for example the second station MT2.

Scenario 3: The fifth station MT5 wants to transmit data to a station which is already transmitting data.

For the following discussion, it is further assumed that the channel capacity of the air interface would not be sufficient for the data arising from the fifth station without a loss of quality on the links which already exist, and that the stations MT2, MT4 and MT6 do not lie within the radio reach of the station MT5.

In such a situation it is possible that, for an existing capability by the fifth station MT5 to transmit data, an internal data buffer of the first station MT1 and an internal data buffer of the fourth station MT4 will no longer be emptied, and an overflow would be threatened.

In the case of scenario 1, when a data overflow was detected, the fifth station MT5 would in accordance with the embodiment be requested by the fourth station MT4 to halt its data service for a period x. If, upon expiration of this period x, the fifth station MT5 were to cause a data overflow during its renewed attempt to transmit the data, then in accordance with the embodiment a request would again be made from the fourth station MT4 for the service to be postponed for a further period x, this time increased by a discrete value.

If a buffer overflow arises at the first station MT1, it will report this to the second station MT2 which, for its part, passes on the request for suspension of the data transmission for a period x to the fifth station MT5.

In the case of scenario 2 and scenario 3 it is possible, for example, to effect the rejection of the fifth station MT5 implicitly, when a capacity bottleneck is detected, by a refusal of the transmit permission, e.g. by refusing the CTS (clear to send), where in the case of scenario 2 this requires in turn a message from the first station MT1 to the second station MT2 about an internal buffer overflow.

Figure 2:
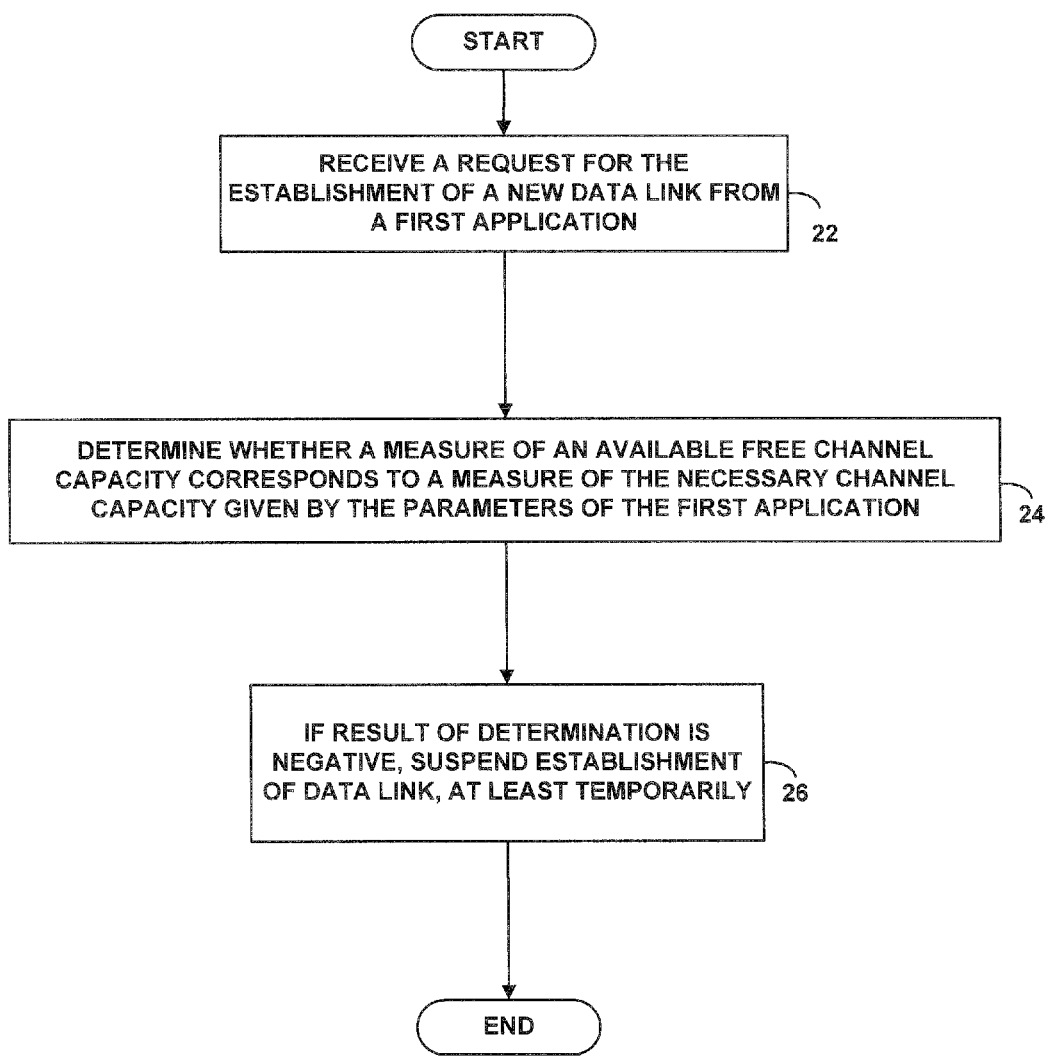
FIG. 2 is a flow chart illustrating one embodiment of the disclosure.

In one embodiment of the invention, and as set forth in FIG. 2, at step 22 a station receives a request for establishment of a new data link from a first application. At step 24, the station determines whether a measure of an available free channel capacity corresponds to a measure of the necessary channel capacity given by the parameters of the first application. During this process, at least part of any data traffic which is assigned to applications with lower priority than the priority of the first application may be considered to be free channel capacity.

At step 26, responsive to a negative determination (i.e., the available free channel capacity is not sufficient to meet the necessary channel capacity given by the parameters of the first application), the station then suspends establishment of the new data link, at least temporarily.

Figure 3:
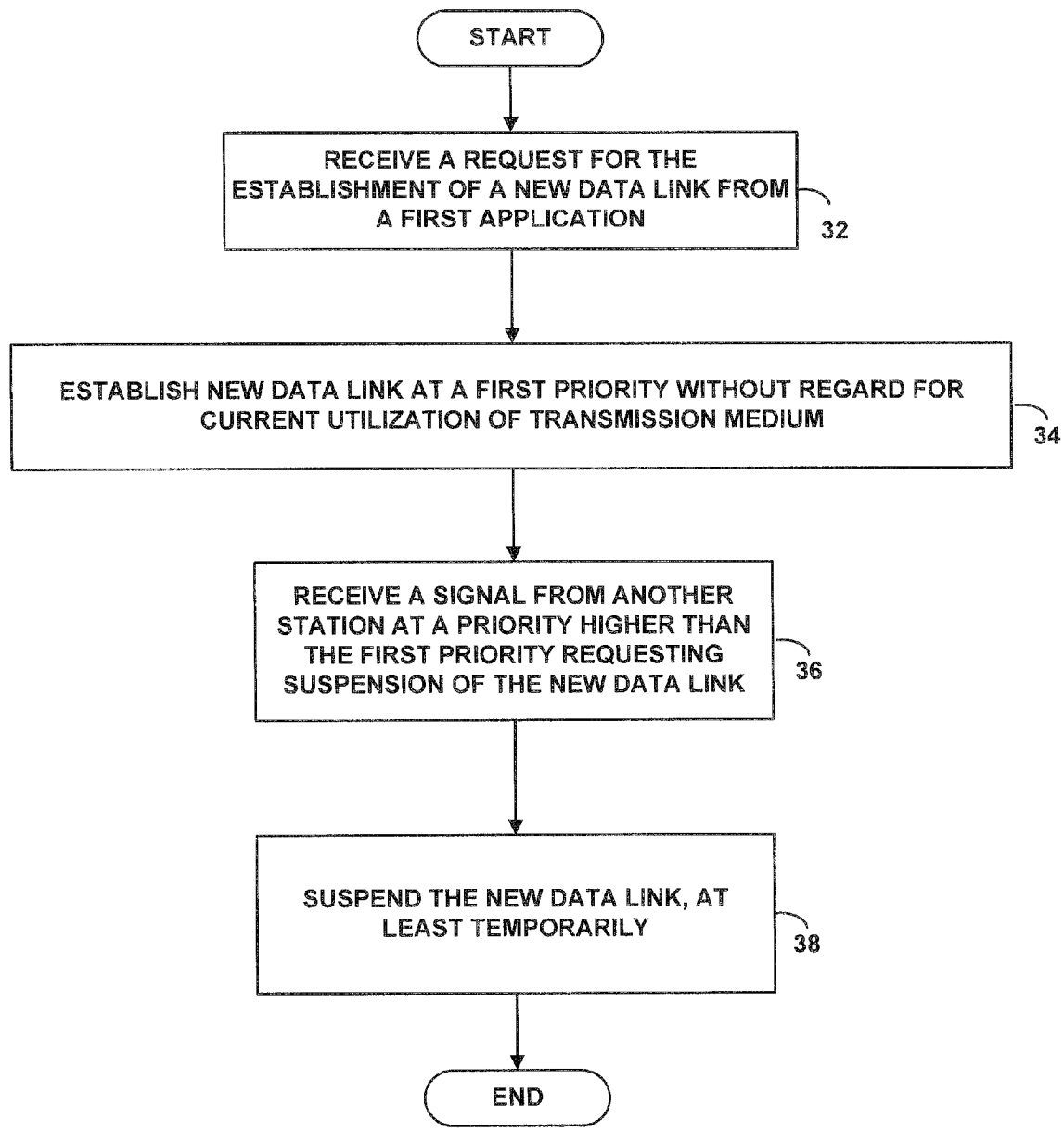
FIG. 3 is a flow chart illustrating another embodiment of the disclosure.

In another embodiment of the invention, and as set forth in FIG. 3, at step 32 a station receives a request for the establishment of a new data link from a first application. At step 34, the station establishes the new data link at a first priority without regard for a current utilization of the transmission medium. At step 36, the station receives a signal from another station at a priority higher than the first priority requesting suspension of the new data link. At step 38, the station suspends the new data link, at least temporarily.

It should be understood that various changes and modifications to the presently preferred embodiments described herein will be apparent to those skilled in the art. Such changes and modifications can be made without departing from the spirit and scope of the present disclosure and without diminishing its intended advantages. It is therefore intended that such changes and modifications be covered by the appended claims.

The invention claimed is:

1. A method comprising:
    determining, at a first wireless station, a free channel capacity of a wireless transmission medium, wherein the free channel capacity includes a currently unused capacity and a currently allocated capacity, and wherein the currently allocated capacity has a priority level lower than a first priority level of a requested new data link having a first channel capacity;
    defining, at the first wireless station, a maximum threshold level of capacity currently allocated to a plurality of applications having a priority level lower than the first priority level that can be applied as free channel capacity, wherein the maximum threshold level of capacity comprises a combination of threshold level capacities for each of the plurality of applications having a priority level lower than the first priority level;
    wherein the first wireless station is configured to make a determination that the free channel capacity at the first priority level is less than the first channel capacity; and
    responsive to the determination that the free channel capacity at the first priority level is less than the first channel capacity, solely determining, at the first wireless station, a first period of time to delay establishment of the requested new data link.

2. The method in accordance with claim 1, further comprising preventing degradation of existing data links having a priority level equal to the first priority level by excluding capacity currently allocated to data links having a priority level equal to the first priority level from the determination of the free channel capacity.

3. The method in accordance with claim 1, further comprising preventing the first wireless station from characterizing all channel capacity currently allocated to data links having a priority level lower than the first priority level above the maximum threshold level as free channel capacity.

4. The method in accordance with claim 3, wherein the maximum threshold level comprises a percentage of capacity currently allocated to data links having the priority level lower than the first priority level.

5. The method in accordance with claim 1, further comprising:
    after the first period of time determining, at the first wireless station, that the free channel capacity at the first priority level is less than the first channel capacity;
    solely determining, at the first wireless station, a second period of time to delay the establishment of the requested new data link; and
    transmitting, from the first wireless station, a request to delay the establishment of the requested new data link for the second period of time, wherein the second period of time is equal to the first period of time increased by a discrete value.

6. The method in accordance with claim 5, wherein the determining a free channel capacity and the transmitting a request to delay the establishment of the requested new data link are repeated until either the establishment of the requested new data link is permitted or the attempt to establish the requested new data link is halted.

7. The method in accordance with claim 1, further comprising:
    determining, at the first wireless station, that a second new data link established by a second wireless station having a priority equal to a priority of one or more existing data links would cause a loss of quality of the one or more existing data links; and
    sending, from the first wireless station, a message to the second wireless station instructing the second wireless station to suspend the second new data link for at least a second period of time.

8. The method in accordance with claim 1, further comprising, after the second period of time, determining, at the first wireless station, that a third new link established by the second wireless station having a priority equal to a priority of the one or more existing data links would cause a loss of quality of the one or more existing data links; and
    sending a second message to the second wireless station instructing the second wireless station to suspend the third new data link for at least a third period of time greater than the second period of time.

9. The method in accordance with claim 7, wherein determining that the second new data link established by the second wireless station having the priority equal to the priority of the one or more existing data links would cause the loss of quality of the one or more existing data links comprises detecting a buffer overflow condition.

10. The method in accordance with claim 1, further comprising detecting a data overflow, at the first wireless station, wherein the data overflow is caused by a data transmission corresponding to the requested new data link.

11. The method in accordance with claim 1, wherein the request to delay the establishment of the requested new data link indicates the first period of time.

12. The method in accordance with claim 1, further comprising transmitting, from the first wireless station, a request to delay the establishment of the requested new data link for the first period of time.

13. A system comprising:
    a first wireless station configured to:
        determine a free channel capacity of a wireless transmission medium, wherein the free channel capacity includes a currently unused capacity and a currently allocated capacity, and wherein the currently allocated capacity has a priority level lower than a first priority level of a requested new data link having a first channel capacity;
        define a maximum threshold level of capacity currently allocated to a plurality of applications having a priority level lower than the first priority level that can be applied as free channel capacity, wherein the maximum threshold level of capacity comprises a combination of threshold level capacities for each of the plurality applications having a priority level lower than the first priority level;
        wherein the first wireless station is configured to make a determination that the free channel capacity at the first priority level is less than the first channel capacity; and
        responsive to the determination that the free channel capacity at the first priority level is less than the first channel capacity, solely determine a first period of time to delay establishment of the requested new data link; and
        transmit a request to delay the establishment of the requested new data link for the first period of time; and
    a second wireless station configured to and receive and process the request to delay the establishment of the requested new data link for the first period of time.

* * * * *